(12) United States Patent  
Ligman

(10) Patent No.: US 6,588,528 B2  
(45) Date of Patent: Jul. 8, 2003

(54) ELECTRIC VEHICLE DRIVE SYSTEM

(75) Inventor: Thomas M. Ligman, Santa Barbara, CA (US)

(73) Assignee: Electric Transportation Company, Santa Barbara, CA (US)

( * ) Notice: Subject to any disclaimer, the term of this patent is extended or adjusted under 35 U.S.C. 154(b) by 35 days.

(21) Appl. No.: 09/918,442

(22) Filed: Aug. 1, 2001

(65) Prior Publication Data

US 2003/0024750 A1 Feb. 6, 2003

(51) Int. Cl.[7] .............................................. B62M 23/02
(52) U.S. Cl. ........................ 180/206; 180/220; 318/139
(58) Field of Search ................................. 180/205, 206, 180/65.1, 65.2, 65.8, 220, 221; 318/138, 139, 254, 439

(56) References Cited

U.S. PATENT DOCUMENTS

| | | | | |
|---|---|---|---|---|
| 3,773,131 A | * | 11/1973 | Jaulmes | 180/206 |
| 3,904,947 A | * | 9/1975 | Crews | 320/138 |
| 4,364,448 A | * | 12/1982 | Ikuma | 180/206 |
| 5,505,277 A | * | 4/1996 | Suganuma et al. | 180/206 |
| 5,602,448 A | * | 2/1997 | Yaguchi | 318/139 |
| 5,603,388 A | * | 2/1997 | Yaguchi | 180/206 |
| 5,664,636 A | * | 9/1997 | Ikuma et al. | 180/206 |
| 5,708,343 A | * | 1/1998 | Hara et al. | 318/599 |
| 5,842,535 A | * | 12/1998 | Dennis | 180/205 |
| 5,845,727 A | * | 12/1998 | Miyazawa et al. | 180/205 |
| 5,857,537 A | * | 1/1999 | Matsumoto et al. | 180/206 |
| 5,860,487 A | * | 1/1999 | Tanaka et al. | 180/206 |
| 5,912,545 A | * | 6/1999 | Monet et al. | 320/107 |
| 5,934,398 A | * | 8/1999 | Hotta | 180/65.8 |
| 5,971,090 A | * | 10/1999 | Tanaka et al. | 180/205 |
| 5,984,038 A | * | 11/1999 | Fujiwara et al. | 180/206 |
| 5,992,553 A | * | 11/1999 | Morrison | 180/206 |
| 6,006,850 A | * | 12/1999 | Yu | 180/220 |
| 6,015,021 A | * | 1/2000 | Tanaka et al. | 180/206 |
| 6,320,336 B1 | * | 11/2001 | Eguchi | 318/139 |

OTHER PUBLICATIONS

ETC Express Rack Installation & Owners' Manual, The Electric Transportation Company, 1998.*

* cited by examiner

Primary Examiner—Brian L. Johnson  
Assistant Examiner—Christopher Bottorff  
(74) Attorney, Agent, or Firm—Milton M. Field

(57) ABSTRACT

An electrically assisted bicycle includes a motor current sensor for controlling a transistor switch in the motor circuit and circuity means establishing a duty cycle and switching rate. The duty cycle is monitored to shut off the motor when the duty cycle approaches an inappropriate level, such as 50%. When the motor control circuit is open and the bicycle is pedal driven, the voltage generated by the motor is monitored to complete the motor control circuit when the bicycle is driven at 4 miles per hour.

18 Claims, 4 Drawing Sheets

ELECTRIC VEHICLE DRIVE SYSTEM

BACKGROUND OF THE INVENTION

1. Field of the Invention

This invention relates to battery powered vehicles, such as bicycles, which augment the driver's pedal power with an electric drive system.

2. Description of the Prior Art

It is known in the prior art to provide battery powered bicycles in which an electric motor connected to an electric battery augments a driver's pedal power. Such prior art systems use various means to overcome problems which arise in their operation. For example, U.S. Pat. No. 5,934,398 is concerned with the problem of "locked rotor" which may result in excessively high loads on the transistors. A complex system for detecting a locked state of the motor and calculating the time required for transistor temperatures to reach an upper limit prevents excessively large loads.

The electric bicycle of U.S. Pat. No. 5,971,090 provides torque limiting with an upper duty cycle limit setting device incorporating a table of the relationship between the upper duty limit of a PWM control and motor torque.

In U.S. Pat. No. 3,773,131, electronic control means permits operation of an electric drive system only after the bicycle reaches a predetermined speed as detected by a pickup.

U.S. Pat. No. 5,603,388 discloses as prior art an electrically powered bicycle which includes an induced voltage detection circuit sensing a voltage included in the motor as it turned by pedal power and controlling a PWM circuit to regulate the closure of a motor switch.

Torque, pedal force, or leg power detecting means are shown in the vehicles disclosed in the U.S. Pat. Nos. 5,857,537; 5,664,636; 5,860,487; 5,992,553; 6,006,850; 5,845,727; 6,015,021; 5,505,277; and 5,984,038.

U.S. Pat. No. 3,904,947 shows a vehicle mounted battery charging system in which a comparator monitors voltage for preventing the driver from driving off while the vehicle is plugged into an AC power outlet.

The motorized bicycle shown in U.S. Pat. No. 5,857,537 includes a current sensor in the motor circuit which inputs a value to a CPU which controls a switching element in the motor circuit for duty control.

SUMMARY OF INVENTION

It is an object of the invention to provide an improved electric drive system for a human-powered vehicle, such as a bicycle. More particularly, it is an object of the invention to provide an electric drive system of this character which effectively performs various functions in a manner which is simple and less complex than drive circuits of the prior art.

According to the invention, a motor drive circuit for a human-powered vehicle, such as a pedal driven bicycle, includes an electric drive motor, energized from a rechargeable battery, and drive means driven by the motor for driving the drive wheel of the vehicle.

The drive motor, which is a D.C. motor, is connected across the battery through a transistor switch and a current sensor resistor. A first comparator monitors the voltage across the sensor resistor. When the voltage across the sensor resistors exceeds a predetermined level as set by a resistor voltage divider, the first comparator changes state and, being connected as an input to a second comparator, pulls down an input to the second comparator, causing the second comparator to change state. The output from the second comparator controls the transistor switch and causes the transistor switch to open the circuit to the drive motor. The transistor switch recloses the circuit to the drive motor when the voltage across the sensor resistor drops below the predetermined level and the voltage level across an RC timing circuit rises to the threshold voltage of the second comparator. The RC timing circuit sets the off time of the transistor switch. By virtue of this arrangement, the duty cycle of the drive motor is established.

When the bicycle is under heavy load, as, for example, when the bicycle is being driven up a steep incline, the drive duty cycle will approach 50%, which indicates that the motor is approaching lock rotor. This situation is monitored by a duty cycle monitoring means including a third comparator. The pulses appearing at the junction between one terminal of the motor and the transistor switch include an A.C. component having negative going portions and positive going portions. A coupling capacitor couples only the A.C. component to an integrating circuit which integrates one of the negative and positive going portions of the A.C. component. When the value of the A.C. component portion integrated reaches a value signifying the approach of 50% duty cycle, the third comparator generates the second control signal to shut off the motor. The integrating circuit includes a diode connected between the coupling capacitor and a reference level for clamping the other portion of the A.C. component to the reference level. A first resistor is connected between the coupling capacitor and an integrating capacitor, which is connected across the input of the third comparator. As the duty cycle approaches 50%, the one portions of the A.C. component are fed to the integrating capacitor; and the charge stored in the integrating capacitor increases until the threshold of the third comparator is reached. This cause the third comparator to provide a signal to open the transistor switch and shut off the motor. A leakage resistor is connected across the diode to provide a leakage path with the first resistor to lower the charge on the integrating capacitor when the time between pulses is large enough (when the duty cycle is not approaching 50% duty cycle).

Because it is undesirable to operate the motor when the bicycle is stationary or operating at a very low speed, the drive circuit includes means to keep the motor from starting until the bicycle speed reaches a predetermined speed, such as approximately four m.p.h. To this end, the circuit includes means to monitor the voltage generated by the motor when it is being turned by operation of the pedals while the motor is not connected across the battery. This means comprises a resistor divider and a monitoring transistor. When the starting switch for the drive circuit is closed, the monitoring transistor monitors the induced voltage generated by the motor. If the induced voltage is less than the predetermined speed, an output from the monitoring transistor inhibits the second comparator from attaining a state which will cause the transistor switch to close the motor circuit. If, however, the induced voltage reaches or exceeds the predetermined speed, the monitoring transistor will permit the second comparator to change state and cause the transistor switch to close the motor circuit.

The system includes a battery charger. A fourth comparator monitors the battery charger and provides an output to the second comparator to inhibit operation of the transistor switch when the charger is energized. In this way, the motor is prevented from running while the motor drive circuit is plugged into the AC line to charge the battery.

BRIEF DESCRIPTION OF THE DRAWINGS

A clearer understanding of the invention will be apparent from the following detailed description and drawings, wherein.

DETAILED DESCRIPTION

Figure 1:
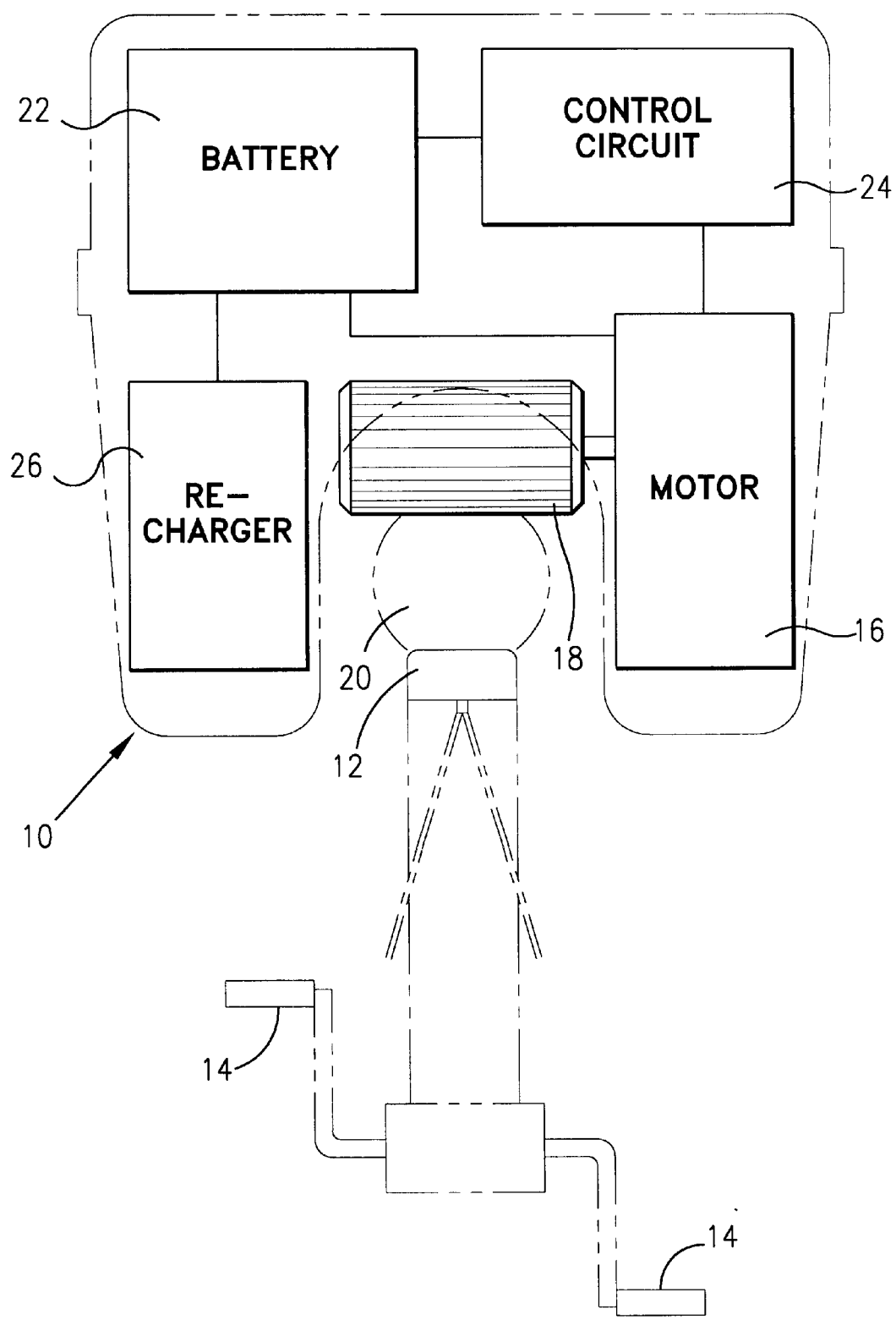
FIG. 1 is a schematic diagram of an electric power pack mounted over the rear wheel of a bicycle and containing a battery, a recharger, a control circuit of the invention, and a drive motor.

The electric vehicle drive system of the invention may be used as a component of a removable power pack mounted over the drive wheel of a bicycle as is taught in U.S. Pat. No. 5,842,535, which is assigned to the same assignee as the present application. This is shown in FIG. 1 where a power pack 10 is mounted over the rear driving wheel 12 of a bicycle which includes pedals 14 by means of which a rider may apply power to driving wheel 12 of the bicycle. A drive motor 16 is mounted within power pack 10 and drives a drive wheel 18 engaged with the tire 20 of drive wheel 12. Motor 16 is energized by battery means 22 under the control of a control circuit 24 of the invention. Battery means 22 is recharged, when needed, by means of recharger 26.

Although the drive system of the invention is shown incorporated in a removable power pack, mounted on a bicycle, it is to be understood that it may also be permanently incorporated in a bicycle coupled to drive the drive wheel though a transmission system as is known in the art. The drive system may also be used in other types of vehicles, such as electrically driven scooters, wheel chairs, and the like.

Figure 2:
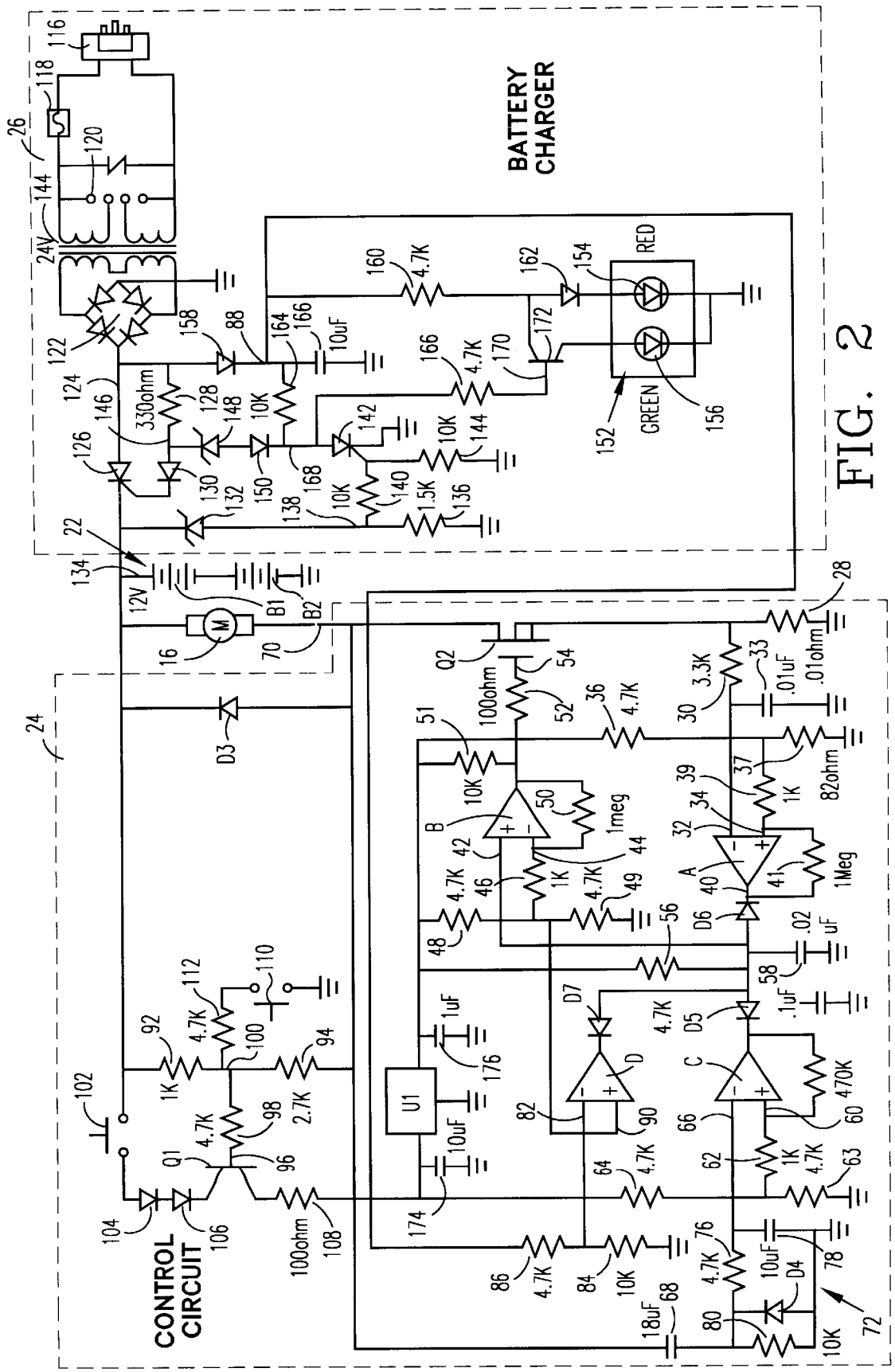
FIG. 2 is a schematic diagram of the control circuit of the invention and a battery charger.

Turning to the schematic diagram of FIG. 2, which shows control circuit 24, battery means 22, and battery charger 26. Motor 16 is a brush type, permanent magnet, D.C. motor. Battery means 22 is the electric power source and includes two 12V,12AH batteries B1 and B2 connected in series. Battery charger 26, which is integrated in the system, is a two step charger designed to provide substantial charge current and trickle charge current.

Control or drive circuit 24 is designed to limit current to motor 16 during start up and heavy load and to extend the running time of the system for each battery charge cycle. Motor 16 is connected to battery means 22 in a circuit completed though transistor switch Q2 and a 0.01 ohm sensing resistor 28. When switch Q2 is closed, the full motor current flows through resistor 28. A comparator A monitors the current level by means of a connection through a 3.3K ohm resistor 30 which provides an indication of the voltage across sensing resistor 28 to a negative terminal 32. A 0.01 microfarad capacitor 33 is connected between terminal 32 and ground. The voltage at terminal 32 is compared with a predetermined voltage at positive terminal 34 provided by a voltage divider comprising a 4.7K ohm resistor 36 and an 82 ohm resistor 37 in series across a 12 volt voltage regulator U1. The junction between resistor 36 and 37 is connected to terminal 34 of comparator A through a 1K ohm resistor 39. Thus, comparator A monitors the current level through sensing resistor 28 by comparing the voltage at terminal 32 with the voltage provided from the resistor divider 36,37 at terminal 34. When the current level through sensing resistor 28 exceeds the level set by resistor divider 36,37, comparator A, which has a 1 megohm feedback resistor 41, changes state providing a low going output signal at output terminal 40.

This low going signal is applied through reverse diode D6 to positive terminal 42 of a comparator B. The negative terminal 44 of comparator B is connected through 1K ohm resistor 46 to the junction of a resistor divide formed by two 4.7K ohm resistors 48 and 49 which are connected across 12 volt voltage regulator U1. Comparator B also has a 1 megohm feedback resistor 50, and a 10K ohm resistor 51 which connects the output of comparator B to 12 volt regulator U1. The low going signal applied to terminal 42 of comparator B causes a change of state, providing a low signal through 100 ohm resistor 52 to the gate electrode 54 of transistor switch Q2 which turns off the transistor and opens the motor circuit.

With switch Q2 open, the current through sensing resistor 28 falls and the voltage at terminal 32 of comparator A falls, changing the state of comparator A so that output terminal 40 is no longer pulled low. Although the output 40 is now high, the voltage level of an RC pair comprising a 4.7K ohm resistor 56 and a 0.02 microfarad capacitor 58 slows the rise of the voltage to terminal 42 to the threshold voltage of comparator B. Transistor Q2 turns back on when it is no longer held low by comparator A and the voltage level of the RC pair 56, 58 rises to the threshold level of comparator B. In this way, RC pair 56, 58 sets the off time of the transistor duty cycle and plays a role in establishing the duty cycle and switching rate of transistor switch Q2. The switching rate and duty cycle are variable and are also affected by other factors, such as the motor current. The time constant of RC pair 56, 58 is 150 microseconds and the switching rate is typically about 6.3 KHertz with a 6.6 KHertz maximum.

The duty cycle is also a function of the load on the motor. As will be explain more fully hereafter with reference to the waveforms of FIG. 3, the duty cycle will decrease when the motor is under heavy load, such as when the bicycle is driven up a steep hill, and may approach 50%. This will bring the motor close to a lock rotor condition and will place an undesirable load on the transistor switch. In order to prevent damage which may result from these circumstances, means to monitor the duty cycle is provided to turn off the motor when the high rate of switching approaches 50% duty cycle. This monitoring means includes comparator C, which has a reference terminal 60 connected through 1K ohm resistor 62 to a resistor divider formed of a pair of 4.7K ohm resistors 63 and 64 connected to 12 volt voltage regulator U1 and setting the threshold voltage of comparator C.

As will be explained more fully below, the motor current is in the form of a series of pulses corresponding to the opening and closing of switch Q2. Close spacing of the negative going and positive going edges of theses pulses is an indicator of an approach to 50% duty cycle. In order to sense this condition, according to the invention, the A.C. component of the pulses is separated from the pulses by coupling it through an 18 microfarad coupling capacitor 68 which is connected between the lower terminal 70 of motor 16 and an integrating circuit 72. In order to integrate the A.C. component, it is necessary to discard either the negative going or positive going portion of the A.C. component by clamping it to a reference level. In the embodiment shown in FIG. 2, the negative going of portion is clamped effectively to ground by diode D4 which is poled to clamp the negative portion of the AC component to ground. As will be explained more fully below with reference to the waveform of FIG. 4, the negative going portion is actually clamped to −0.07 volts due to the voltage drop across diode D4. This leaves the positive going portion available for integration. It is applied through a 4.7K ohm resistor 76 to a 10 microfarad integrating capacitor 78, which is connected between input terminal 66 of comparator C and ground. Integrating means 72 also includes a 10K ohm resistor 80 in parallel with diode D4.

As coupling capacitor 68 couples the AC component to integrating means 72, the negative going portions are effectively clamped to ground by diode D4. On the other hand, the positive going portions are coupled by resistor 76 and stored in integrating capacitor 78. The charge stored in capacitor 78 may then leak to ground through a leakage path of resistors 76 and 80. It will be noted that the time constant of the charging path of resistor 76 and capacitor 78 is lower than the time constant of the leakage path of resistor 80 and 76 and capacitor 78. Thus, when pulses are close together, capacitor 78 will be charged more quickly than it is discharged. However, when the pulses are less close, as will be the case when the duty cycle is not approaching 50% duty cycle, there will be time for the charge to leak off, keeping the charge from building up on capacitor 78. When the duty cycle is approaching 50% duty cycle, the charge will build up on capacitor 78 until the threshold point of comparator C is reached. Comparator C will then change state bringing the output low. This low output is then applied through reverse diode D5 to terminal 42 of comparator B, bringing the output of comparator B low causing switch Q2 to open, shutting down motor 12. The trip frequency which will trigger comparator C is 10 Hz.

It is not desirable to start the motor while battery charger 26 is operational. Among other things, the vehicle could drive off while the unit is plugged into an AC power source. Accordingly, the battery charger is monitored so that the motor can be kept in an off state while battery charge 26 is energized. For this purpose, comparator D has an input terminal 82 connected to a resistor divider having a 10K ohm resistor 84 and a 4.7K ohm resistor 86 in series connected from a point 88 on the input side of charger 26. When charger 26 is energized, a voltage will appear on terminal 82 causing comparator D to change state and provide a low output through reverse diode D7 to terminal 42 of comparator B, causing switch Q2 to open shutting down the motor. The threshold setting terminal 90 of comparator D receives a reference voltage from resistor divider 48, 49.

Since it is not desirable to start the motor when the bicycle is stationary, the system is designed to prevent the motor from being turned on until the bicycle speed reaches approximately 4 mph. In order to monitor vehicle speed, the system takes advantage of the property of the motor to act as a generator when the motor is turned by pedal power with its circuit open. A transistor Q1 is used to monitor the voltage generated by motor 16. A resistor divider including a 1K ohm resistor 92 and 2.7K ohm resistor 94 are connected in series across motor 16. The gate electrode 96 of transistor Q2 is connected through a 4.7K ohm resistor to the junction 100 between resistors 92 and 94. With the bicycle in motion, the on-off switch 102 of the system is closed, applying the voltage generated by motor 16 across resistor divider 92, 94. Diodes 104 and 106 are introduced between switch 102 and transistor Q1 to set the amount of voltage generated by motor 16 which will trigger transistor Q1. When the desired speed of 4 mph is reached with switch 102 closed, motor 16 generates a voltage (usually about 10 volts), which when applied to gate electrode 96, causes transistor Q1 to conduct. With transistor Q1 conducting, the voltage across battery means 22 is applied through 100 ohm resistor 108 to voltage divider U1 thereby supplying voltage to voltage regulator U1 and then to the components of the control circuit.

For test purposes, junction 100 may be connected to ground through a 4.7K ohm resistor 112 through a switch 110. A diode D3 is connected across motor 12 to shunt power back to the battery when voltage is generated by motor 12 to avoid burning out transistor switch Q2.

Battery charger 26 is a transformer type charger, using a 24V, 56VA center tap transformer 114. An A.C. plug 116 is connected to a power source and is connected through a fuse 118 to transformer 114. Terminal set 120 permits the user to accommodate to a 110V or 220V source with appropriate use of selectable jumpers. The 24V output from transformer 114 is full wave rectified by rectifier bridge 122. The rectified output at 124 is regulated by SCR 126, the control electrode of which is connected to rectified output 124 through a 330 ohm resistor 128 and a diode 130. SCR 126 passes each rectified half wave to battery means B1 as long as the battery voltage is below the zener voltage of zener diode 132 which is connected between upper battery terminal 134 and ground through a 1.5K ohm resistor 136.

The junction 138 between zener diode 132 and resistor 136 is connected through a 10K ohm resistor 140 to the control electrode of an SCR 142, which is also connected to ground through a 10K ohm resistor 144. SCR 142 is connected to the junction 146 between resistor 128 and diode 130 through zener diode 148 and diode 150 and from its lower end to ground. Upon the voltage across battery means 22 reaching the voltage of zener diode 132, SCR 142 fires and turns on regulator zener diode 148 which establishes a trickle charge allowing SCR 126 to pass half wave cycles to battery means 22 so long as the battery voltage is below the zener voltage of zener diode 148. Battery means B1 is charged to 30 volts but the combination of zerer diode 148 and diode 150 sets the trickle charge float voltage of 27 volts.

Battery charger 26 includes an indicator 152 which includes a red LED 154 to indicate that charger 26 is in a charge state and a green LED 156 to indicate that charger 26 is in a trickle state. LED 154 is in a branch circuit from rectified output 124 to ground, including diode 158, a 4.7K ohm resistor 160 and diode 162 in series with LED 154. A 10K ohm resistor 164 is connected from the lower end of diode 158 to the lower end of diode 150 with a 10 microfarad capacitor 166 connected between the lower end of diode 158 to ground.

When battery charger 26 is charging battery means 22, current will flow from rectified output 124 through diode 158, resistor 160, diode 162, and LED 154 to ground, illuminating red charge indicator LED 154. The circuit for LED 156 includes a 4.7K ohm resistor 166 connected from the junction 168 between diode 150 and SCR 142 to the gate electrode 170 of transistor 172, the emitter-collector path of which is connected between the lower end of resistor 160 and LED 156. Green trickle charge LED 156 is illuminated when SCR 142 fires turning an transistor 172 to complete the circuit to LED 156.

When transistor 172 turns on it places a branch consisting of transistor 172 and LED 156 in series in parallel with a branch consisting of diode 162 and LED 154 in series, causing a drop in the voltage across the diode 162, LED 154 branch, extinguishing red LED 154.

When starting switch 102 is closed, the application of pedal power causes motor M to generate a voltage which, upon the vehicle reaching 4 m.p.h., causes firing of transistor switch Q1. The battery voltage is then applied through transistor Q1 and resistor 108 to voltage regulator U1. A smoothing 10 microfarad capacitor 174 is connected to ground across the input to regulator U1 and another smoothing 1 microfarad capacitor 176 is connected to ground across the output side of regulator U1.

Figure 3:
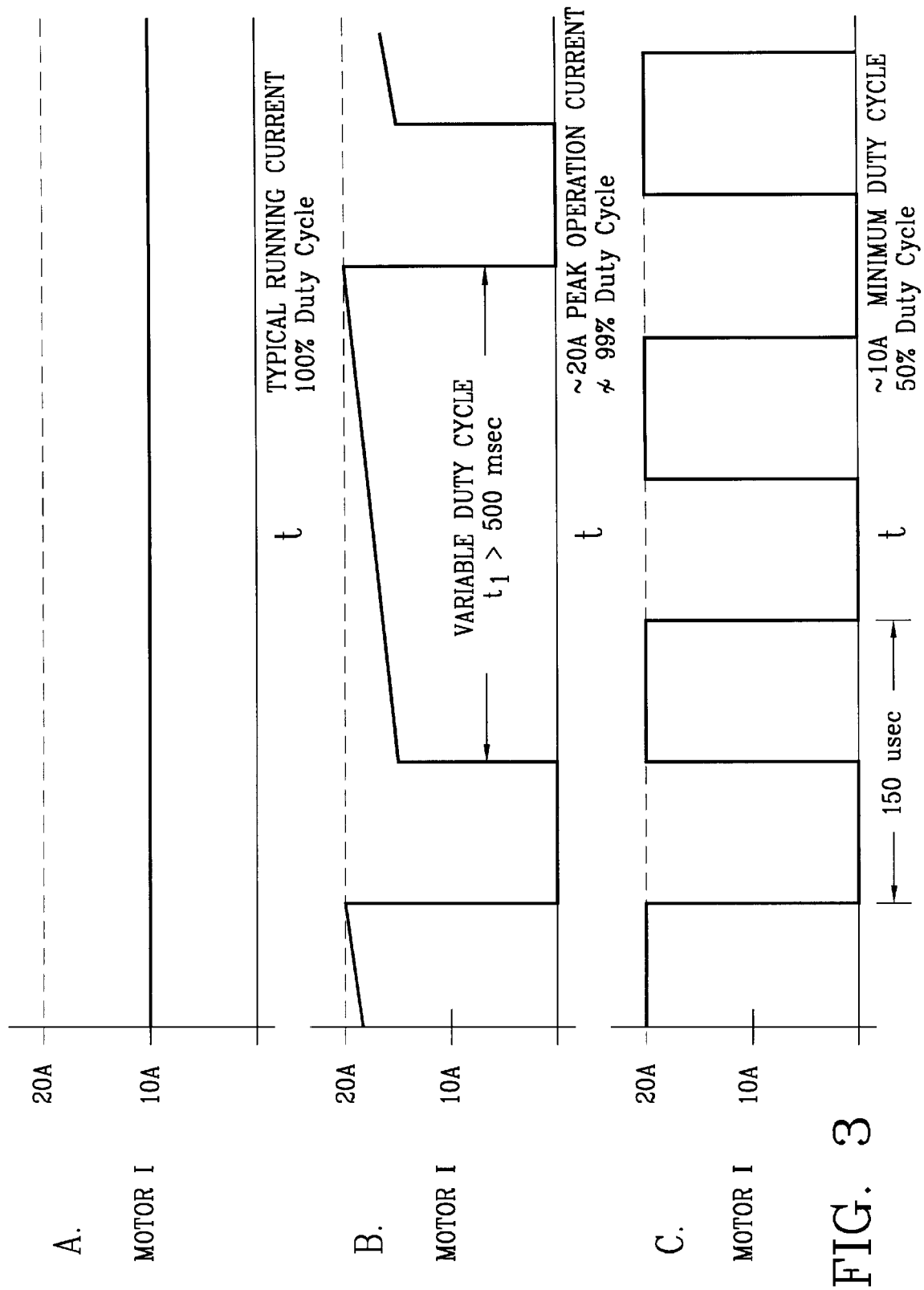
FIG. 3 is a graphical representation of motor current waveforms for three different conditions of operation.

Turning to the waveforms of FIG. 3, curve A depicts a typical running current where motor 16 is drawing 10 amperes of current with motor 16 operating well below its maximum current and is typical of the situation when a pedaled bicycle is being augmented by electric motor 16 as the bicycle moves on relatively level ground. Since the current drawn by motor 16, is below the predetermined current level set by sensing resistor 28, transistor switch Q2 does not open to cut off current flow through motor 16.

When, however, the bicycle is under greater load, as when motor 16 is started or when the bicycle begins to go up a hill, the predetermined current level set by sensing resistor 28 is exceeded. Transistor switch Q2 then opens to establish a variable duty cycle as shown by waveform B. The off time between current pulses is uniform, being set by RC timing circuit 56, 58. As indicated, the on time of waveform B can be as great as 500 milliseconds, and the peak operating current is 20 amperes at about 99% duty cycle.

When the load becomes excessive, as when the bicycle is being driven up a steep hill, the motor current approaches a minimum duty cycle of 50% as shown by waveform C. At this time, the motor is approaching "lock rotor" and motor 16 and electric switch Q2 are in danger of becoming overheated. In order to avoid this condition, the drive circuit of the invention includes means as described above for monitoring when the motor approaches 50% duty cycle and lock motor.

Figure 4:
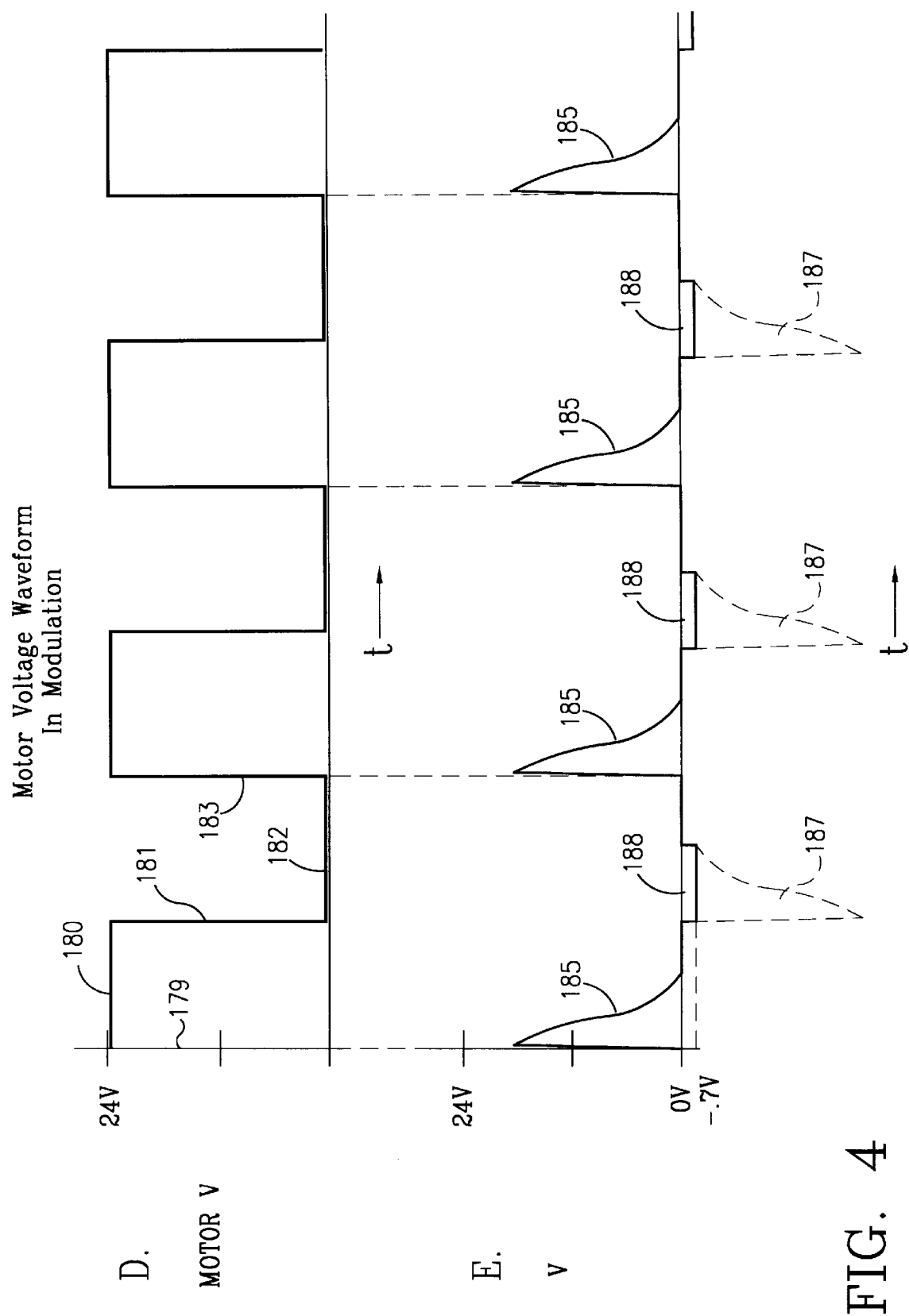
FIG. 4 is a graphical depiction of motor voltage and the A.C. component thereof coupled through a coupling capacitor to integrating means of the invention.

The voltage waveforms of FIG. 4 illustrate the technique used for sensing this condition. Waveform D shows the voltage across motor 16 as the duty cycle approaches 50% duty cycle. When switch Q2 is closed, a 24 volt pulse 180 is applied across the motor, this pulse having a positive going edge 179. When switch Q2 opens there is a negative going edge 181 to a small, residual voltage 182, followed by a positive going edge 183 when switch Q2 closes.

The approach to 50% duty cycle is monitored, by coupling the A.C. component of the motor voltage waveform only (not coupling the D.C. component) through coupling capacitor 68 to integrating means 72. One of the positive and negative portions of the A.C. component is then disregarded by clamping it to a reference level. This is illustrated by waveform E. The motor voltage waveform includes an A.C. component with a positive going portion 185, which begins at the positive going edge of each pulse, such as at 179 and 183. The negative going portion 187 (shown in dotted line in FIG. 4) mirrors positive going portion 185. It is shown in dotted line, because it is clamped to a −0.7 volt reference level by diode D4. In operation, positive going portion 185 is applied through resistor 76 to integrating capacitor 78. Since negative going portion 187 is clamped to a reference level, it is mostly not applied to integrating capacitor 78. Only the residual −0.7 volt "stump" 188 is applied to integrating capacitor 78 and its effect is negligible. When positive going portions 185 are closely spaced, as when the duty cycle is approaching 50%, a charge will build up on integrating capacitor 78 until comparator C is triggered to shut down motor 16. When the positive going portions 185 are more widely spaced, there will be time for the charge deposited in integrating capacitor 78 to leak off through leakage path resistors 76 and 80, keeping the charge on capacitor 78 from building up to the trigger voltage of comparator C.

Although the embodiment described in this application is an electric battery power assisted bicycle, it is to be understood that the principles of the invention are equally applicable to other electric power assisted vehicles which are powered by a human operator, such as scooters and wheel chairs.

It should also be understood that the foregoing description of the invention is intended merely to be illustrative and other modifications, embodiment and equivalents may be apparent to those skilled in the art without departing from the spirit and scope of the invention.

This invention claimed is:

1. A motor drive circuit for electrically driven vehicles, comprising:

an electric drive motor and drive means driven by said motor for driving a wheel of said vehicle; an electric battery;

switch means for, when closed, establishing a motor circuit for the flow of motor current from said electric battery through said drive motor;

control circuit means for controlling said switch means;

current sensing means for monitoring said motor current from said battery through said drive motor and providing a first control signal when said motor current exceeds a predetermined level, said control circuit means in response to said first control signal opening said switch means to cut off said motor current through said motor circuit and, a predetermined time after said motor current falls below said predetermined level, reclosing said switch means to establish a duty cycle and drive switching rate of said motor current, said motor current having a series of pulses with a positive going edge when said switch means closes establishing said flow of motor current and a negative going edge when said switch means opens to cut off said motor drive current through said motor; and duty cycle monitoring means providing a second control signal when said duty cycle approaches an inappropriate duty cycle, said control circuit means shutting off said motor in response to said second control signal.

2. A motor drive circuit of claim 1, wherein said control circuit means comprises a first comparator, said first and second control signals each changing the state of said first comparator, to open said switch means and open said circuit through said electric drive motor.

3. A motor drive circuit of claim 2, wherein said current sensing means comprises a second comparator and means providing an excess current signal to an input of said second comparator to change the state of said second comparator to provide said first control signal to said first comparator.

4. A motor drive circuit of claims 3, wherein said duty cycle monitoring means comprises a third comparator and means sensing an inappropriate duty cycle condition at an input of said third comparator to change the state of third comparator to provide said second control signal to said first comparator.

5. A motor drive circuit of claim 1, wherein said motor current has an AC component with negative going portions and positive going portions, where said duty cycle monitoring means comprises: means coupling said AC component only to integrating means, when the value of said component integrated reaches a value signifying the approach of an inappropriate duty cycle, generating said second control signal to shut off said motor.

6. A motor drive circuit of claim 5, wherein said integrating means comprises diode means for clamping said other portions of said AC component to a reference level.

7. A motor drive circuit of claim 6, wherein said other portions of said AC component are said negative going portions.

8. A motor drive circuit of claim 6, wherein said means coupling said AC component comprises a coupling capacitor.

9. A motor drive circuit of claim 8, wherein said integrating means comprises a first resistor connected between said coupling capacitor and an integrating capacitor, a second resistor connected between said coupling capacitor and said reference level, said first and second resistor in series comprising a leakage path to said reference level from said integrating capacitor, the time constant of said first resistor and integrating capacitor being smaller than the time constant of said integrating capacitor and said leakage path.

10. A motor drive circuit of claim 9, wherein said diode means comprises a diode in parallel with said second resistor poled to clamp said other portions of said AC component to said reference level.

11. A motor drive circuit of claim 1, wherein said control circuit means includes a time delay circuit for determining said predetermined time.

12. A motor drive circuit for electrically driven vehicles, comprising:

an electric drive motor and drive means driven by said motor for driving a wheel of said vehicle;

an electric battery;

switch means for, when closed, establishing a motor circuit for the flow of motor current from said electric battery through said drive motor;

control circuits means for controlling said switch means in response to said motor current to establish a duty cycle and drive switching rate of said motor current, said motor current having a series of pulses with a positive going edge when said switch means closes establishing said flow of motor current and a negative going edge when said switch means opens to cut off said motor drive current through said motor; and duty cycle monitoring means for providing a control signal when said drive switching rate approaches an inappropriate duty cycle, said control circuit means in response to said control signal shutting off said motor.

13. A motor drive circuit of claim 12, wherein said motor current has an AC component with negative going portions and positive going portions, and wherein said drive duty cycle monitoring means comprises: means coupling said AC component only to integrating means, said integrating means integrating one of said portions of said AC component and means, when the value of said component integrated reaches a value signifying the approach of said inappropriate duty cycle, generating said control signal to shut off said motor.

14. A motor drive circuit of claim 13, wherein said integrating means comprises diode means for clamping said other protons of said AC component to a reference level.

15. A motor drive circuit of claim 14, wherein said other portions of said AC component are said negative going portions.

16. A motor drive circuit of claim 14, wherein said means coupling said AC component only comprises: a coupling capacitor, and wherein said integrating means comprises a first resistor connected between said coupling capacitor and an integrating capacitor, a second resistor connected between said coupling capacitor and said reference level, said first and second resistors in series comprising a leakage path to said reference level from said integrating capacitor, the time constant of said first resistor and said integrating capacitor being smaller the time constant of said integrating capacitor and said leakage path.

17. A motor drive circuit of claim 16, wherein said diode means comprises a diode in parallel with said second resistor poled to clamp said other portions of said AC component to said reference level.

18. A motor drive circuit of claim 12, wherein said inappropriate duty cycle is a 50% duty cycle.

* * * * *

UNITED STATES PATENT AND TRADEMARK OFFICE
CERTIFICATE OF CORRECTION

PATENT NO. : 6,588,528 B2
DATED : July 8, 2003
INVENTOR(S) : Thomas M. Ligman

It is certified that error appears in the above-identified patent and that said Letters Patent is hereby corrected as shown below:

Column 3,
Line 25, should read -- The schematic diagram of Fig. 2 shows --.

Column 5,
Line 30, change "charge" to -- charger --.

Column 6,
Line 29, change "zerer" to -- zener --.

Column 10,
Line 14, change "protons" to -- portions --.
Line 27, insert -- than -- after "smaller".

Signed and Sealed this

Ninth Day of September, 2003

JAMES E. ROGAN
*Director of the United States Patent and Trademark Office*